Feb. 3, 1970  M. B. LUCAS ET AL  3,493,150
PACKAGE CLOSURE
Filed Dec. 21, 1967  2 Sheets-Sheet 1
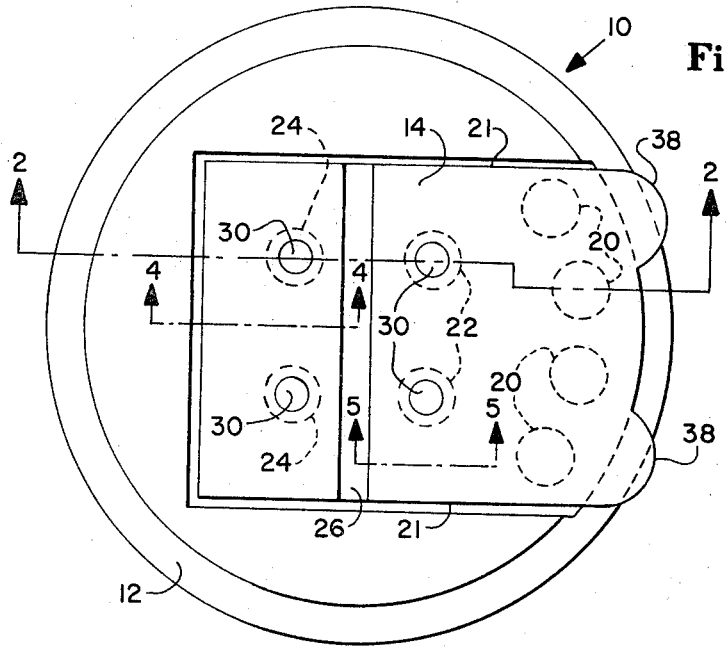
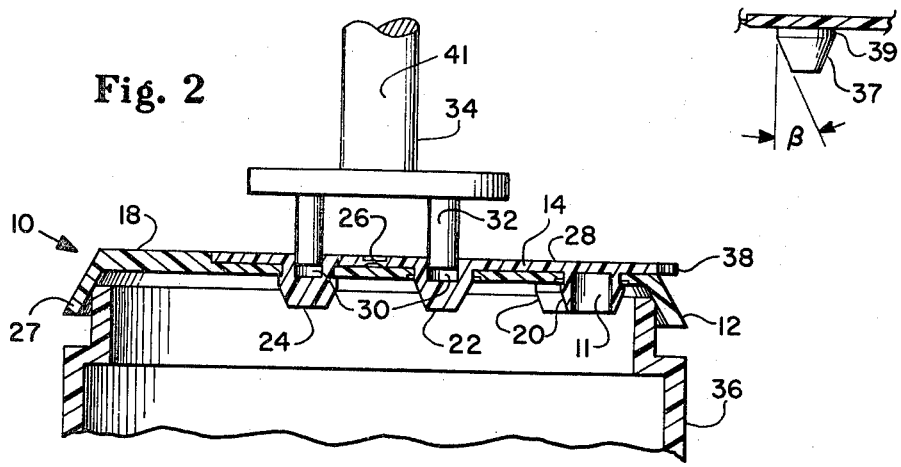
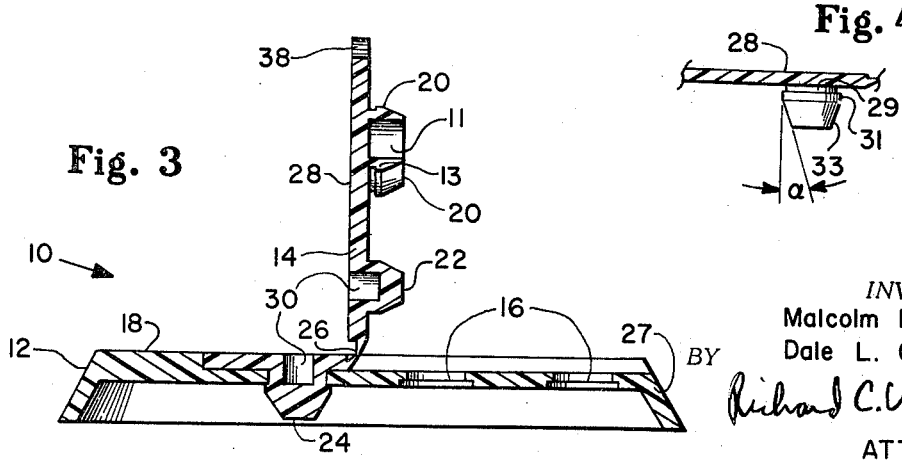
INVENTORS
Malcolm B. Lucas
Dale L. Crane
BY Richard C. Witte
ATTORNEY Feb. 3, 1970   M. B. LUCAS ET AL   3,493,150
PACKAGE CLOSURE
Filed Dec. 21, 1967   2 Sheets-Sheet 2

INVENTORS
Malcolm B. Lucas
Dale L. Crane
BY Richard C Witte
ATTORNEY

United States Patent Office 3,493,150
Patented Feb. 3, 1970

3,493,150
PACKAGE CLOSURE
Malcolm B. Lucas and Dale L. Crane, Cincinnati, Ohio, assignors to The Procter & Gamble Company, Cincinnati, Ohio, a corporation of Ohio
Filed Dec. 21, 1967, Ser. No. 692,437
Int. Cl. B67d 3/00
U.S. Cl. 222—480                           4 Claims

ABSTRACT OF THE DISCLOSURE

A thermoplastic package closure which incorporates in at least one reclosure plug or interlocking protuberance extending from its cover member into its closure body, a blind passageway opening to the top of the closure so that the mandrel of a spinwelding machine may be readily drivingly engaged with the closure.

FIELD OF THE INVENTION

This invention relates to a package closure, and more particularly to a two-piece thermoplastic closure comprising a closure body and a cover member having protuberant formations serving the dual purpose of fastening the cover member to the closure body and effecting the transfer of rotary motion from the mandrel of a spinwelding machine to the closure, thereby facilitating connection of the closure to a thermoplastic container.

BACKGROUND OF THE INVENTION

Spinwelding is a technique well known to the packaging art by which thermoplastic package components may be united and is accomplished by pressing the components together and moving one at high speed relative to the other so that the contacting surface of each is heated to its melting point, forming a molten interface between the parts. Upon formation of the molten interface, relative rotation is stopped and the interface is allowed to cool under pressure, thereby creating an integral connection between the parts. Several types of apparatus are existent for accomplishing the spinwelding process, representative of which are those disclosed in U.S. Patent 3,245,858, Dec. 12, 1966, to K. Negoro and U.S. Patent 3,344,010, Sept. 26, 1967, to Norman J. Franz. Relative speeds, friction heating time, and cooling time necessary to formation of sound spinweld joints are not critical and may vary with the particular components being joined. Various spinwelding operating conditions, procedures and equipment are disclosed in the aforementioned patent to Franz and Negoro, the disclosures of which are herein incorporated by reference.

A thermoplastic package closure which is to be spinwelded to its package body must contain means for engaging the mandrel of a spinwelding machine so that the required rotational motion and pressure may be applied to the closure. One preferred drive system is to incorporate on the spinwelding machine mandrel one or more pins adapted to engage apertures in the closure. Variations of such pin engagement are illustrated in the previously cited patents to Negoro and Franz. One such variation is that shown in Negoro's FIGURE 13 wherein is shown a center pin 198 adapted to engage an aperture or depression in the center of a closure member and a drive pin 199 adapted to engage another such aperture, depression, or blind passageway in a closure member. Negoro recites further variations on his drive arrangement (column 8, 11. 61-73), emphasizing that a clutch relationship between a spinwelding mandrel and a closure may be accomplished by holes, projections, or recesses on the closure which cooperate with the mandrel.

Negoro's disclosure apparently contemplates either apertures functional to the closure or lugs or recesses, specially provided for clutching engagement with a spinwelding mandrel. Franz, U.S. Patent 3,344,010, previously cited, illustrates the former; that is, use of apertures functional to the closure to clutchingly engage a spinwelding mandrel. The pins 68, shown in FIGURE 1, are spaced to drivingly engage apertures 80 in the closure L, the apertures 80 being functional to the closure in that they provide the means of dispensing product from the container being assembled.

The spinwelding mandrel engagement means generally disclosed in the cited patents to Negoro and Franz, while admittedly accomplishing their intended function, are desirably subject to improvement. Dependence on product dispensing apertures to engage a spinwelding mandrel as in Franz precludes application of the spinwelding technique to closing filled and sealed packages. The obvious alternative to the means in Franz is to provide special lugs or depressions in a closure to clutchingly engage a spinwelding mandrel, as suggested by Negoro, so that a sealed closure could be spinwelded to the container. This alternative, however, has disadvantage in that specially provided driving means appear as extraneous appendages or holes on a marketed package. It is desirable therefore to provide a package closure whose dispensing means may be sealed before assembly of the closure to its container and which contains means of drivingly engaging a spinwelding machine such that the driving means is integral to an otherwise functional part of the closure.

OBJECTS

It is an object, therefore, to provide a means of drivingly engaging a package closure with a spinwelding mandrel, which driving means serves a dual fuction in that it is functional to the closure apart from the spinwelding operation.

A further object of this invention is to provide said driving means such that spinwelding a package closure to its package body may be accomplished after the closure dispensing apertures are sealed.

A further object of this invention is to provide the said driving means at no increase in materials cost over that of the basic package closure.

BRIEF DESCRIPTION OF THE DRAWINGS

While the specification concludes with claims particularly pointing out and distinctly claiming the subject matter of the instant invention, it is believed that the invention will be better understood from the following description taken in connection with the accompanying drawings in which:

FIGURE 1 is a plan view of a preferred embodiment of the invention;

FIGURE 2 is a fragmentary sectional view of said preferred embodiment taken along line 2—2 of FIGURE 1 and illustrating engagement of the closure of this invention by a spinwelding mandrel when the closure is mounted on the finish of a container;

FIGURE 3 is also a sectional view of said preferred embodiment taken along line 2—2 of FIGURE 1 but illustrating the cover member 14 in an open position;

FIGURE 4 is a fragmentary sectional view taken along the line 4—4 of FIGURE 1;

FIGURE 5 is a fragmentary sectional view taken along the line 5—5 of FIGURE 1;

DESCRIPTION OF THE PREFERRED EMBODIMENTS

Figure 6:
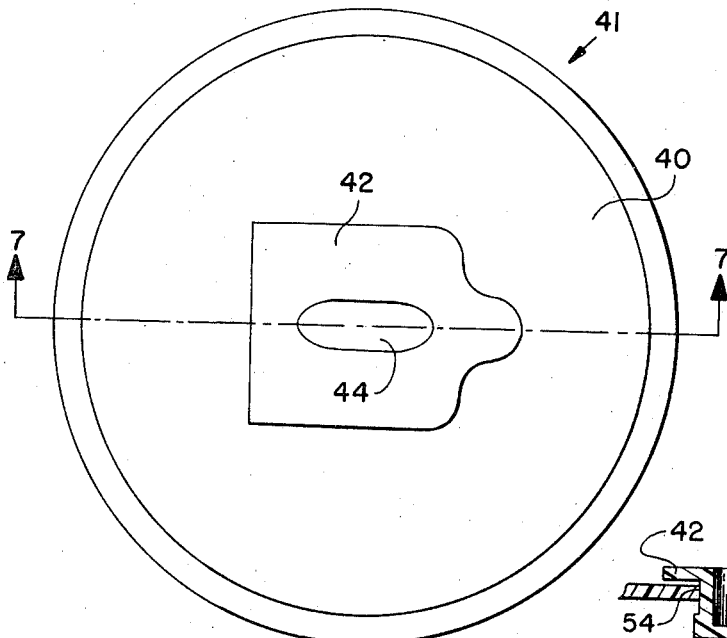
FIGURE 6 is a plan view of a further embodiment of the present invention.

One preferred embodiment of the invention may be understood by reference to FIGURES 1 through 5. The closure 10 comprises a substantially circularly shaped closure body 12 and an overlying cover member 14. In cross-section, as seen in FIGURES 2 and 3, the closures body 12 is an inverted, shallow, dish-shaped object. While such a cross-section is convenient for illustration, the closure body 12 is not required to be the shape shown, and can be, for example, a flat disk or a shallow closed-end cylinder.

While dimensions of the closure body are not critical it must be of sufficient rigidity to withstand the forces normally encountered during the spinwelding operation, which forces may range from 1 pound to ten pounds. In a typical application, a polyethylene closure body of the general configuration shown in FIGURES 1–3 having an outside diameter of 2.3 inches was designed having a top wall thickness of .035 inch at its center section and .090 inch at the periphery and a side wall 27 which was about .060 inch thick.

The closure body must be formed of a spinweldable thermoplastic. Examples of thermoplastics which lend themselves to spinweld assembly are polyethylene, polyvinyl chloride, polyvinyl acetate and polypropylene. Those listed do not exhaust the possible materials, nor does selection of one such material rather than another affect the practice of the instant invention.

The closure body 12 contains a plurality of apertures 16 through its top wall 18, which are sized and spaced to receive the protuberances comprising releasably interlocking reclosure plugs 20, reclosure plugs 22, and fastening plugs 24. Many variations in number and arrangement of protuberances and metering apertures are permissible; however, for purposes of illustration, a description of a preferred embodiment is included herein. The embodiment illustrated by FIGURES 1–4 was designed with eight protuberances depending from cover member 14 and telescoping within the apertures 16. Two each of the protuberances comprised fastening plugs 24 and reclosure plugs 22. The two reclosure plugs 22 and the two fastening plugs 24 were equally spaced on a .656 inch diameter circle concentric with the closure body 12 at 45 degrees from the molded hinge line 26 (hereinafter described) which intervenes the fastening plugs 24 and the reclosure plugs 22. The four releasably interlocking reclosure plugs 20 were located on the same side of the hinge line 26 as the reclosure plugs 22 on an .812 inch radius arc at 22½ degree spacing and symmetrical with the cover member sides 21.

One form of fastening plug 24 is illustrated in some detail by FIGURE 4. It comprises a shank 29 whose diameter is slightly larger than the diameter of the aperture 16 into which it extends, a shoulder 31 of slightly larger diameter, and a tapered section 33 which facilitates entry of the protuberance into its mating aperture. In the typical application of the closure referred to above, in which the closure body 12 and cover member 14 were constructed of polyethylene, the diameter of the shank 29 was .234 inch, the diameter of the shoulder 31 was .240 inch, angle α was 15 degrees, the length of the tapered portion 33 was .090 inch, the length of the shank 29 was .037 inch, and the aperture 16 into which the protuberance extends had a .218 inch diameter, thereby providing a tight interference fit between the interlocking protuberance and its mating aperture. The interference fit should desirably range from about .006 to about .032 inch, and should preferably range from about .010 to about .020 inch when the cover member 14 and closure body 12 are constructed of polyethylene.

The releasably interlocking reclosure plugs 20 are of the same general form as the fastening plugs 24, described above, and may also be best shown by FIGURE 4. In the particular example cited above with respect to the fastening plugs 24, dimensions identical to those described above were provided to accomplish positive closure of the apertures 16. Identity of dimensions of the fastening plugs 24 and releasably interlocking reclosure plugs 20 is, of course, not essential or necessarily preferred, except perhaps to minimize manufacturing costs by standardizing hole and plug sizes.

Opening on the bottom of the releasably interlocking reclosure plugs 20 are blind passageways 11 which result in the releasably interlocking plug comprising a thin walled hollow cylinder. This bottom opening core which comprises the passageway 11 provides some flexibility to the cylindrical walls 13 to aid facile opening and reclosure of the aperture 16 into which the releasably interlocking reclosure plug 20 extends while at the same time permitting sufficient interference fit between the reclosure plug 20 and aperture 16 to assure that the shoulder 31 (see FIGURE 4 will interlock within the aperture 16 and preclude inadvertent opening of the package closure 10. In the example cited above, a .156 inch diameter passageway 11 was provided interiorly to the .234 inch shank diameter reclosure plug 20.

The reclosure plugs 22 are best illustrated in detail by FIGURE 5. The plug comprises a cylindrical shank 39 of a slightly larger diameter than that of its mating aperture 16. A tapered section 37 is provided to facilitate entry of the plug into its mating aperture. In the example referred to above, the diameter of the shank 39 was .234 inch to maintain an interference fit with a .218 inch diameter aperture, the length of the shank 39 was .060 inch, and the angle β of the tapered portion 37 was 30 degrees. Again these dimensions are only representative and may be varied considerably without affecting the instant invention.

Intervening the fastening plugs 24 and the reclosure plugs 22 is an integrally molded hinge line 26. The hinge line 26 comprises a thinned section in the cover member 14 and has a thickness typically in the range of from .010 to about .015 inch, although this may be varied somewhat so long as sufficient flexibility is maintained to allow functioning as a hinge.

As may be most readily seen from FIGURE 3, opening on the upper surface 28 of the cover member 14 are one or more blind passageways 30, each of which is located coaxially of one of the protuberances, i.e., fastening plugs 24 or reclosure plugs 22, and extending partially through the thickness of the cover member 14 into the interior of the associated protuberance. Dimensions of the said blind passageway may vary with different applications; however, in the example cited hereinbefore respecting the cover member 14, passageways of .156 inch diameter were provided interiorly to .234 inch shank diameter protuberances.

The passageways 30 permit rotationally interlocking engagement of a sealed closure with the mandrel 34 of a spinwelding machine as shown in FIGURE 2. Driving pins 32 on the mandrel 34 are inserted in the passageways 30 in a manner somewhat similar to that of the above cited Franz and Negoro patents. The blind passageways 30 and pins 32 are located with respect to the drive shaft 41 of the mandrel 34 such that when engaged the drive shaft 41 is coaxial with the closure 10 and container body 36. This can be accomplished by locating the pins in a pattern coaxial with the shaft 41 and locating the passageways 30 in a pattern coaxial with the closure 10. Alternatively, the pins 32 and passageways 30 can be each non-coaxial with and equally offset from the respective centerlines of the shaft 41 and closure 10 so that on engagement of the mandrel with the closure the shaft 41 and the closure 10 will be positioned coaxially. Many variations in passageways 30 and drive pin 32 locations are of course possible and will be operative so long as the coaxial relationship described exists at the time of engagement thereof.

By locating the passageways 30 coaxial of the reclosure plugs 22 and fastening plugs 24, two advantages are gained. First, spinwelding mandrel engagement means are provided without appending extraneous bosses to the exterior of the cap or extra material to the interior of the cap to provide for blind passageways. Secondly, engaging the driving pins 32 within the passageways 30 during the spinwelding operation as hereinafter described assures a proper interlock of the fastening plugs 24 with their mating apertures 16 and proper seating of the reclosure plugs 22 because of the drive pins 32 pressing down on the inside of the said protuberances.

FIGURE 1 illustrates lift tabs 38 on the cover member 14 which, while forming no part of the present invention, may be incorporated to facilitate opening the closure 10. The closure 10 may be opened by grasping a lift tab 38 with the fingers and lifting it upwardly from the closure body 12, thereby removing the reclosure plugs 22 and releasably interlocking reclosure plugs 20 from their mating apertures 16 and moving the cover member 14 into the position shown by FIGURE 3. Reclosure may be accomplished by merely pushing on the top wall 28 of the cover member 14 and forcing the removed protuberances back into their mating apertures 16.

The cover member may be made of the same material as used for the closure body 12, or inasmuch as the cover member need not be spinweldable, any material which can be formed as generally shown and can be provided with hinge means equivalent to the hinge 26.

Assembly of a package incorporating the present invention comprises the steps of assembling the cover member 14 to the closure body 12 by telescoping the reclosure plugs 20 and 22 and fastening plugs 24 into their corresponding apertures 16, loosely placing the assembled closure 10 on the container body 36 coaxially beneath the mandrel 34 of a spinwelding machine, engaging the pins 32 of mandrel 34 within the passageways 30 of the closure 10 as shown in FIGURE 2, spinning the closure 10 relative to the container body 36 until a molten interface results, stopping the said relative rotation, and cooling the interface while maintaining pressure on the closure. Variations in procedure are of course possible, and the procedure can be mechanized for high production rates as in the previously cited patents to Negoro and Franz.

Figure 9:
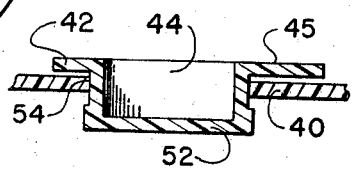
FIGURE 9 is a fragmentary sectional view taken along line 7—7 of FIGURE 6.
Figure 7:
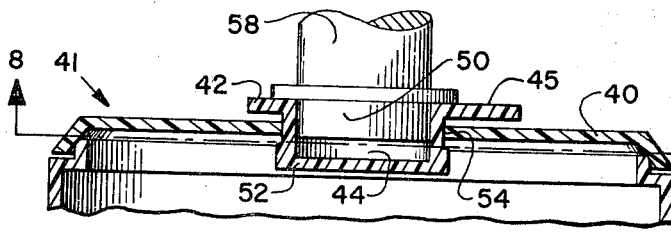
FIGURE 7 is a fragmentary sectional view similar to FIGURE 2, taken along the line 7—7 of FIGURE 6.
Figure 8:
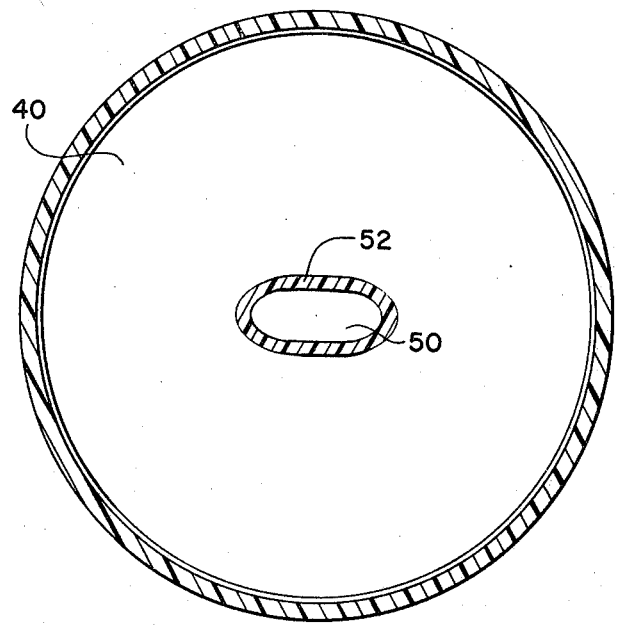
FIGURE 8 is a sectional view taken along the line 8—8 of FIGURE 7.

FIGURES 6-9 illustrate a further embodiment of the present invention which comprises a non-captive cover member 42 with a single protuberance 52 depending therefrom and a closure body 40 with a single aperture contained therein. The aperture 54 and protuberance 52 are generally oval in cross-section as may be seen in FIGURE 8. Thus, rotary motion may be transmitted from the cover member 42 to the closure body 40. As with the preferred embodiment described above, the cover member contains a blind passageway 44 coaxial with the protuberance opening on the top surface 45 of the cover which serves the same dual function of engaging a pin on a spinwelding mandrel and promoting positive seating of the protuberance through action of the pin on the spinwelding mandrel. To assure the objectives of the present invention, the blind passageway 44 is of the same noncircular cross-section as the protuberance 52 and aperture 54. Thus, a noncircular pin 50 on the mandrel 58 of a spinwelding machine may be engaged with the passageway 44 and transmit rotary motion to the closure 41.

The embodiment shown in FIGURES 6-9 may be made of the same materials as may be used for the embodiment of FIGURES 1-5. Dimensions are not critical and may be, for example, similar in magnitude to those cited above in connection with the embodiment of FIGURES 1-5, making due allowance, of course, to provide the noncircular cross-section on the protuberance 52.

The procedure for spinwelding a package closure of the embodiment shown by FIGURES 6-9 is similar to that described for assembling the preferred embodiment to a package, and is apparent from reading the cited description.

What is claimed is:

1. A package closure comprising a substantially circular shaped thermoplastic closure body containing at least one eccentrically positioned aperture, said aperture extending through the top wall thereof, and a cover member overlying said closure body and non-rotationally interlocked therewith to prevent relative rotation therebetween, said cover member having on the lower surface thereof a protuberance telescoped within said aperture, a blind passageway defined by an opening on the outer surface of the cover member coaxial with said protuberance and extending thereinto, said passageway being of uniform cross-section throughout its axial extent and adapted to accept a pin depending from the mandrel of a spinwelding machine when said mandrel and said cover member are coaxially oriented, whereby the said mandrel can be engaged within said blind passageway and impart rotary motion to said package closure to facilitate spinwelding attachment thereof to a package body.

2. A package closure comprising a substantially circircularly shaped thermoplastic closure body containing a plurality of eccentrically positioned apertures extending through the top wall thereof and a hinge-equipped cover member overlying said closure body, said cover member having at least one protuberance comprising a fastening plug depending therefrom and interlockingly engaged within a said aperture, said cover member having at least one protuberance comprising a reclosure plug depending from the bottom thereof and telescoped within a said aperture, said reclosure plugs and fastening plugs being cumulatively equal in number to said apertures and positioned to extend therewithin, said cover member being non-rotationally interlocked with said closure body to prevent relative rotation therebetween and containing a hinge comprising a molded hinge line intermediate the aforesaid fastening plugs and the said reclosure plugs, said cover member containing a plurality of blind passageways opening on the outer surface of said cover member coaxial with said protuberances and extending partially through the thickness of said cover member in direct alignment with and into the interior of said protuberances, said blind passageways having a uniform cross-section throughout their axial extent, whereby the pins of a mandrel of a spinwelding machine can be simultaneously engaged within said blind passageways when said mandrel and said closure body are coaxial to effect the transfer of rotary motion for spinwelding attachment of said package closure to a package body.

3. The package closure of claim 2 wherein the said reclosure plugs and said fastening plugs are engaged within said apertures in an interference fit ranging from .010 to .020 inch.

4. A package closure comprising a substantially circularly shaped thermoplastic closure body containing eight eccentrically positioned apertures extending through the top wall thereof and a hinge-equipped cover member overlying said closure body; said cover member having eight protuberances depending therefrom comprising two fastening plugs interlockingly engaged within two of said apertures, two reclosure plugs telescoped within two of said apertures, and four releasably interlocking reclosure plugs extending within four of said apertures; said cover member being non-rotationally interlocked with said closure body to prevent relative rotation therebetween; said fastening plugs and said releasably interlocking reclosure plugs comprising an upper cylindrical portion, a a central cylindrical portion of slightly larger diameter than the upper cylindrical portion, and a lower frusto-conical portion tapering downwardly inward; said reclosure plugs comprising a cylindrical portion and a frusto-conical portion tapering downwardly inward from the cylindrical portion; said apertures having a diameter of 2.18 inch, said reclosure plugs having a diameter of .234 inch, and the upper cylindrical portion of said fastening plugs and said releasably interlocking reclosure plugs having a diameter of .234 inch; said cover member containing a hinge comprising a molded hinge line having a thickness of from .010 to .015 inch intermediate the aforesaid fastening plugs and the said reclosure plugs; the said cover member containing four .156 inch diameter blind passageways the lateral cross-sectional configuration of which is defined by an endless internal surface substantially perpendicular to and opening on the outer surface thereof, said passageways being coaxial with said fastening plugs and said reclosure plugs and extending partially through the thickness of said cover member in direct alignment with and into the interior of said protuberances and having a uniform cross-section through their axial extent, whereby the pins of a mandrel of a spinwelding machine can be simultaneously engaged within said blind passageways when said mandrel and said closure body are coaxial to effect the transfer of rotary motion for spinwelding attachment of said package closure to a package body.

References Cited

UNITED STATES PATENTS

| | | | |
|---|---|---|---|
| 2,939,617 | 6/1960 | Hassler | 222—480 X |
| 2,942,748 | 6/1960 | Anderson | 156—73 X |
| 3,031,111 | 4/1962 | Stull | 222—541 |
| 3,127,063 | 3/1964 | Fairchild | 222—556 X |
| 3,140,019 | 7/1964 | Barr | 222—480 |
| 3,217,949 | 11/1965 | Davis | 222—480 |
| 3,255,928 | 6/1966 | Foster | 222—546 X |

ROBERT B. REEVES, Primary Examiner